No. 702,122. Patented June 10, 1902.
C. E. ZIEGLER.
COFFEE POT.
(Application filed Jan. 23, 1902.)

(No Model.)

WITNESSES
Warren W Swartz

INVENTOR
Charles E. Ziegler
by Bakewell & Byrnes
his attys.

THE NORRIS PETERS CO., PHOTO-LITHO., WASHINGTON, D. C.

UNITED STATES PATENT OFFICE.

CHARLES EDWARD ZIEGLER, OF PARNASSUS, PENNSYLVANIA.

COFFEE-POT.

SPECIFICATION forming part of Letters Patent No. 702,122, dated June 10, 1902.

Application filed January 23, 1902. Serial No. 90,960. (No model.)

*To all whom it may concern:*

Be it known that I, CHARLES EDWARD ZIEGLER, of Parnassus, Westmoreland county, Pennsylvania, have invented a new and useful Coffee-Pot, of which the following is a full, clear, and exact description, reference being had to the accompanying drawings, forming part of this specification, in which—

Figure 1:
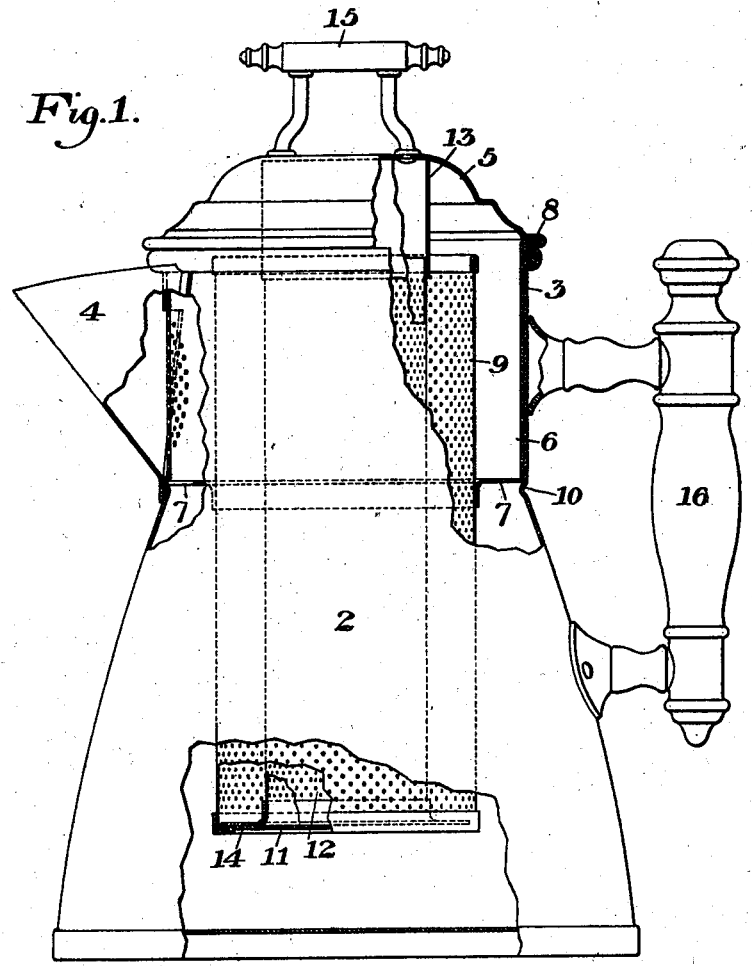
Figure 2:
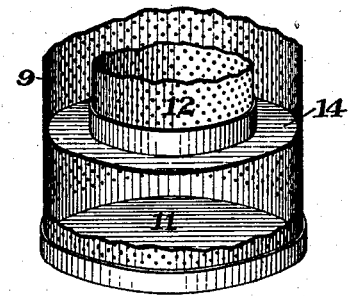

Figure 1 is a side elevation, partly broken away, of my improved coffee-pot; and Fig. 2 is a detail perspective view showing the inner percolator-tube partly lifted.

My invention relates to coffee-pots, and is designed to provide an improved percolator system and means for supporting same in the pot and also to combine with the improved percolator a revoluble shell to seal the spout when desired.

In the drawings, 2 represents the body of my improved coffee-pot, and 3 an upper cylindrical portion thereof, provided with a spout 4. The cover 5, which is of general dome shape, is provided with a depending cylindrical shell 6, which fits neatly within the upper portion of the pot, the lower end of the shell contacting with an annular flange 7 on the percolator when the outer flange 8 of the cover reaches the top of this cylindrical body portion. The flange 7 is secured to the percolator 9, rests upon an annular beaded or crimped portion 10 at the base of the cylindrical part of the body, and when the parts are in place the cylindrical shell clamps the percolator in place against the bead and prevents rattling, the inner percolator-cylinder being held by the cover-top. The percolator-cylinder 9 is formed of perforated metal and is provided with a closed bottom 11 and an open top. Inside the percolator-cylinder is a smaller cylinder 12, also of perforated metal, to which is secured a metal band 13 at its top, while an outwardly-projecting annular flange-ring 14 is secured to its open lower end. The flanged ring 14 fits neatly within the percolator-cylinder and holds the inner cylinder centrally therein. It also serves to eject the grounds when the inner cylinder is drawn out. The revoluble shell is provided with a transverse handle 15 to enable the shell to be turned, the shell having a series of perforations at one point in its circumference which may be brought into registry with the spout to allow the coffee to be poured out. The flange 7 is cut out or notched in the part which registers with the spout to allow passage of the coffee. The band at the top of the inner cylinder fits upwardly within the cover, so that when the cover is removed the operator can grasp this band, and owing to the packing of the coffee-grounds in the annular zone between the percolator and the inner cylinder he can lift out the entire percolator, and then pull out the inner cylinder, and thus eject the grounds. 16 is the usual side handle for the pot.

In using this coffee-pot the ground coffee is filled into the space between the inner and outer cylinders of the percolator, and boiling water may then be poured into the open top of the inner cylinder. As the bottom of the percolator is closed, the water is forced to percolate outwardly through the zone of coffee, the pouring being preferably regulated so that the column of water will not exceed the height of the coffee zone. The percolator extends down a sufficient distance so that the coffee solution may be boiled or heated in contact with the coffee, if desired.

The advantages of my invention result from the simple, neat, and compact arrangement of the parts, the ease with which they are assembled and taken apart, and the efficient percolator action which is obtained.

Many variations may be made in the form and arrangement of the parts without departing from my invention.

I claim—

1. A coffee-pot having its sides provided with intermediate inward projections, a cylindrical percolator supported upon said projections, said percolator having perforated sides and a closed bottom supported above the bottom of the pot, and a removable perforated metallic cylinder with an open top, within the percolator-cylinder and forming an annular space between the two cylinders substantially as described.

2. A coffee-pot having inward projections and a percolator supported on said projections and having perforated sides and a closed bottom above the bottom of the pot, an open-topped perforated cylinder of smaller diameter within the percolator-cylinder and extending to its bottom, and a centering device for holding the inner cylinder centrally within the percolator; substantially as described.

3. A coffee-pot having a percolator with a cylindrical perforated shell and a closed bottom, the percolator being supported within the pot with its bottom above the bottom of the pot, an inner removable perforated shell of smaller diameter than the percolator, and an outwardly-projecting flange at the bottom of the inner shell fitting upon the closed bottom of the percolator; substantially as described.

4. A coffee-pot having an upper cylindrical portion with inward projections at its lower end, a spout in said cylindrical portion, a cover having a revoluble shell fitting within the cylindrical part of the coffee-pot and having a perforated side portion, and a percolator having a flange resting on the inward projections, the shell being arranged to hold the flange down upon said projections; substantially as described.

5. A coffee-pot having an upper cylindrical portion with an inward bead at its lower end, a spout in the cylindrical portion, a percolator having projections resting on the bead and supporting the percolator above the bottom of the pot, said percolator having perforated sides and a closed bottom, an inner perforated cylinder within the percolator leaving an annular space between the two, and a cover having a perforated revoluble shell within the upper cylindrical portion of the pot; substantially as described.

In testimony whereof I have hereunto set my hand.

CHARLES EDWARD ZIEGLER.

Witnesses:
    H. M. CORWIN,
    L. M. REDMAN.